United States Patent
Urtiga

(10) Patent No.: US 8,632,236 B2
(45) Date of Patent: Jan. 21, 2014

(54) LED LIGHTING MODULE AND LIGHTING DEVICE COMPRISED THEREOF

(75) Inventor: Lucas Urtiga, Laval (CA)

(73) Assignee: GE Lighting Solutions, LLC, East Cleveland, OH (US)

( * ) Notice: Subject to any disclaimer, the term of this patent is extended or adjusted under 35 U.S.C. 154(b) by 0 days.

(21) Appl. No.: 13/289,869

(22) Filed: Nov. 4, 2011

(65) Prior Publication Data

US 2013/0114295 A1 May 9, 2013

(51) Int. Cl.
*F21V 7/04* (2006.01)

(52) U.S. Cl.
USPC ........... 362/612; 362/616; 362/630; 362/631; 362/611

(58) Field of Classification Search
USPC .................. 362/600, 611, 612, 616, 630, 631
See application file for complete search history.

(56) References Cited

U.S. PATENT DOCUMENTS

| | | | |
|---|---|---|---|
| 6,481,131 B2 | 11/2002 | Gianotti et al. | |
| 7,063,449 B2 | 6/2006 | Ward | |
| 7,172,324 B2 | 2/2007 | Wu et al. | |
| 7,311,431 B2 * | 12/2007 | Chew et al. | 362/613 |
| 7,350,951 B2 * | 4/2008 | Sakai et al. | 362/555 |
| 7,524,101 B2 | 4/2009 | Parker | |
| 7,717,605 B2 * | 5/2010 | Shibata | 362/630 |
| 7,736,044 B2 * | 6/2010 | Chew et al. | 362/612 |
| 7,796,209 B2 * | 9/2010 | Ajichi et al. | 349/61 |
| 7,826,698 B1 * | 11/2010 | Meir et al. | 385/31 |
| 7,909,496 B2 | 3/2011 | Matheson et al. | |
| 2004/0240230 A1 | 12/2004 | Kitajima et al. | |
| 2005/0116667 A1 | 6/2005 | Mueller et al. | |
| 2005/0254258 A1 * | 11/2005 | Lee | 362/612 |
| 2006/0221638 A1 * | 10/2006 | Chew et al. | 362/613 |
| 2006/0245213 A1 * | 11/2006 | Beil et al. | 362/616 |
| 2007/0133193 A1 | 6/2007 | Kim | |
| 2007/0189032 A1 * | 8/2007 | Chang | 362/600 |
| 2007/0218751 A1 | 9/2007 | Ward | |
| 2008/0019147 A1 | 1/2008 | Erchak et al. | |
| 2008/0037284 A1 | 2/2008 | Rudisill | |
| 2008/0080208 A1 * | 4/2008 | Chen et al. | 362/600 |
| 2008/0170415 A1 * | 7/2008 | Han et al. | 362/612 |
| 2009/0296026 A1 * | 12/2009 | Bae et al. | 349/65 |
| 2010/0002465 A1 | 1/2010 | Tsang et al. | |
| 2010/0027293 A1 | 2/2010 | Li | |
| 2010/0103346 A1 * | 4/2010 | Ajichi et al. | 349/62 |

(Continued)

FOREIGN PATENT DOCUMENTS

WO 2008157723 A1 12/2008
WO 2010140103 A1 12/2010

OTHER PUBLICATIONS

EP Search Report and Opinion dated Mar. 6, 2013 from corresponding EP Application No. 12191043.4

*Primary Examiner* — David J Makiya
*Assistant Examiner* — Bryon T Gyllstrom
(74) *Attorney, Agent, or Firm* — Global Patent Operation; Marc A. Vivenzio

(57) ABSTRACT

A lighting module and lighting device are described. Embodiments of the lighting modules comprise light emitting diodes (LEDs), a power supply, and a waveguide that disperses light from the LEDs to illuminate a lighted side of the lighting module. In one embodiment, the lighting module comprises a substrate, on which the LEDs and power supply are mounted. The substrate includes an interface that permits the lighting module to communicate with an adjacent lighting module when positioned in an array that forms an LED lighting device.

11 Claims, 5 Drawing Sheets

(56) References Cited

U.S. PATENT DOCUMENTS

| | | |
|---|---|---|
| 2010/0149834 A1* | 6/2010 | Kim et al. .................... 362/612 |
| 2010/0177749 A1 | 7/2010 | Essinger et al. |
| 2010/0195350 A1 | 8/2010 | Schattinger et al. |
| 2010/0226146 A1* | 9/2010 | Cho et al. ..................... 362/612 |
| 2011/0032697 A1 | 2/2011 | Hu et al. |
| 2011/0157917 A1 | 6/2011 | Chang et al. |
| 2011/0255303 A1 | 10/2011 | Nichol et al. |

* cited by examiner

C-C

US 8,632,236 B2

LED LIGHTING MODULE AND LIGHTING DEVICE COMPRISED THEREOF

BACKGROUND

1. Technical Field

The subject matter of the present disclosure relates to lighting devices and, more particularly, to the use of lighting modules comprising light emitting diodes (LEDs) for constructing lighting devices.

2. Description of Related Art

Use of fluorescent and incandescent light fixtures is common. These light fixtures are found in residential and commercial premises, often in the form of large, panel-like fixtures (e.g., fluorescent fixtures) or recessed, can-like fixtures (e.g., incandescent and compact-fluorescent fixtures). Panel-like fixtures typically comprise a housing with one or more fluorescent bulbs or "tubes." A diffuser panel covers the bulbs. The diffuser panel comprises a translucent or transparent material, with or without surface patterning, that promotes uniform emission of light through the light emitting surface of the fixture and into the lighted space.

Panel-like fixtures and can-like fixtures are likely found in suspended ("drop") ceilings. These ceilings include a grid of support members in combination with cables or tie members that hang the grid from the ceiling. Panels and tiles populate the openings in the grid. In one construction, one or more light fixtures also fit within the openings (or within the tiles themselves) to replace or supplement certain ones of the tiles. This arrangement maintains the look and continuity of the ceiling.

In addition to fluorescent and incandescent technology, new generations of lighting fixtures an array of light emitting diodes (LEDs) to generate light. LEDs offer many advantages over their fluorescent and incandescent counterparts. These advantages include, for example, much higher efficiency and longer operating lifetimes, potentially on the order of 100,000 hours or more. Moreover, the compact size of LEDs reduces the overall dimensions (e.g., thickness) of the resulting lighting fixture. For example, thin and ultra-thin designs for LED-based lighting fixtures and panels place LEDs about the periphery of the fixture to form an "edge-lit" lighting fixture as opposed to the traditional "back-lit" lighting fixture in which LEDs (or fluorescent bulbs) are dispersed perpendicular to the light emitting surface of the fixture.

As discussed above, edge-lit lighting fixtures include an array of LEDs, as well as a power supply and a light guide that disperses light from the edges of the fixture to uniformly light the light emitting surface. For many applications, the LEDs couple in series, thus the number of LEDs determines the size, shape, and other requirements for the power supply.

BRIEF DESCRIPTION OF THE INVENTION

The present disclosure describes embodiments of a lighting fixture comprising light modules that reduce the size of the power supply. Examples of the light modules produce light for a portion of the light emitting surface of the lighting fixture. In one example, the lighting fixture can comprise a plurality of the light modules to change the size, shape, and other features of the light emitting surface as desired.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Figure 1:
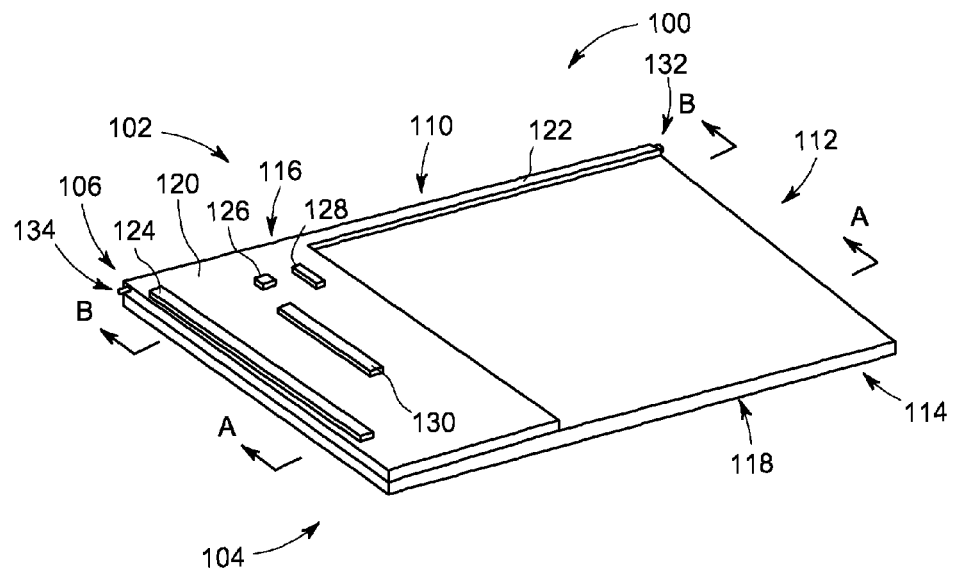
FIG. 1 depicts a top, perspective, assembly view of an exemplary embodiment of a lighting module.
Figure 2:
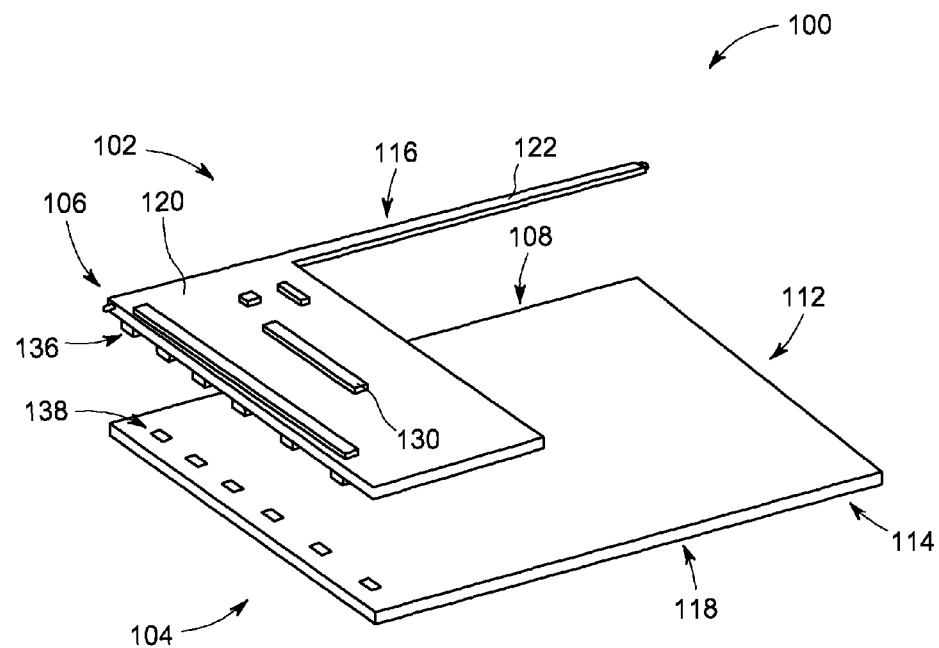
FIG. 2 depicts a top, perspective, exploded assembly view of the lighting module of FIG. 1.

FIGS. 1 and 2 illustrate an exemplary embodiment of a lighting module 100 for use in an LED lighting device that replaces conventional lighting fixtures, e.g., fluorescent lighting fixtures. Examples of the lighting module 100 come equipped with light emitting diodes (LEDS) and a power unit, which provides power to the LEDs. Construction of the lighting module 100 permits the lighting module 100 to couple with and exchange signals (e.g., electrical signals) with other ones of the lighting module 100. Thus, when a plurality of the lighting modules 100 are used in an LED lighting device, two or more of the lighting modules 100 can communicate or "talk" to one another.

FIG. 1 shows the lighting module 100 in its assembled form. The lighting module 100 has a back side 102 (or "back plane 102") and a front side 104 (or "lighted plane 104") from which the lighting module 100 emits light. The lighting module 100 also has a lit edge 106 and one or more an unlit edges (e.g., edges 110, 112, 114). In the present example, the lighting module 100 includes a substrate 116 and a waveguide 118 secured to the substrate 110. The waveguide 118 disperses light from the lit edge 106 to the unlit edges to illuminate and emit light from the front side 104.

The substrate 110 can include a populated portion 120 and an elongated portion 122 extending from the populated portion 120. The elongated portion 122 can extend along one of the unlit edges (e.g., edge 110), terminating at or near another of the unlit edges (e.g., edge 112). The substrate 102 can comprise a printed circuit board (PCB) and like laminated structures to support and electrically connect components (e.g., electrical components) mounted thereon. In the present example, the lighting module 100 can include a heat sink 124, a processor 126, memory 128, and a power unit 130, which itself can include a plurality of electrical components not shown herein. In one example, the lighting module 100 also includes an interface (e.g., a first interface 132 and a second interface 134) that permits adjacent ones of the lighting modules 100 to communicate with one another. The interface can include a connector (e.g., the first interface 132) and a port (e.g., the second interface 134), or combination thereof, wherein the connector can couple with the port when the lighting module 100 is assembled adjacent other ones of the lighting module 100 in the LED lighting device.

As best shown in the exploded assembly of FIG. 2, the lighting module 100 includes a plurality of light emitting diodes (LEDs) 136 and corresponding openings 138 that penetrate the waveguide 118. The openings 138 expose the LEDs 136 to the interior of the waveguide 118. The present disclosure contemplates the use of various types of LEDs (e.g., surface mount, through-hole mount, organic LEDs, etc.) in various colors (e.g., red, green, blue, orange, etc.) and combinations of colors. The LEDs 136 traverses the lit edge 106. Spacing of the LEDs 136 permits uniform distribution of light across the front side 104.

Figure 3:
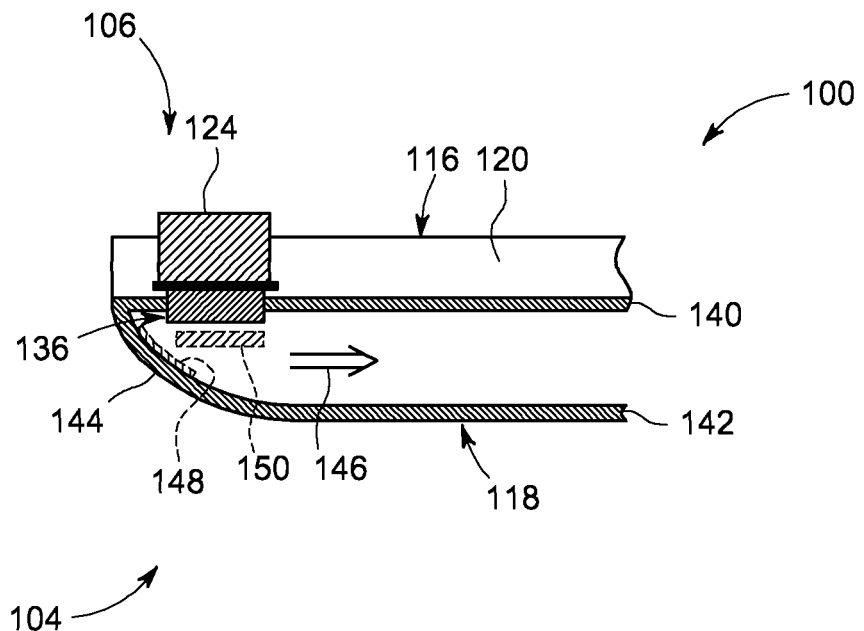
FIG. 3 depicts a side, cross-section of a portion of the lighting module of FIG. 1.

FIG. 3 illustrates a cross-section of the lit edge 106 taken at line A-A of FIG. 1. As shown, the waveguide 118 includes an upper member 140, a lower member 142, and an outer edge member 144 proximate the LEDs 136. The outer edge member 144 directs light from the LEDs 136 away from the lit edge 106 towards the interior of the waveguide 118, as generally indicated by the arrow 146. In one example, the lighting module 112 may include a reflector element 148 and/or optics element 150, both of which may help to disperse light from the lit edge 106 and across the front side 104 of the lighting module 100.

The waveguide 118 can comprise acrylic or similar polymer or other materials that are amenable to parameters of construction (e.g., cost) of the lighting module 100. Suitable materials are likewise compatible with monolithic construction of the waveguide 118 using various extruding, molding, and mass production techniques. The upper member 140 can be substantially reflective or employ a reflective coating that propagates light throughout the interior of the waveguide 118. The lower member 142 can be partially and/or fully transparent to light, although construction of the lower member 142 may also take into consideration properties of the emitted light that is proper for lighting the given environment (e.g., office space, home, etc.). Layers of material (e.g., coatings) may be added to, or as part of, the lower member 142 to change the emissive properties of the lighting module 100 as necessary. Exemplary materials may be more or less reflective, refractive, or have properties that effect the diffusion of light and specific light wavelengths through the lower member 142.

The outer edge member 144 can comprise a curve or radius (as shown) of known diameter that extends along the length of the lit edge 106. The radius can, in combination with material and/or coating selection, provide appropriate reflective properties to direct light from the lit edge 106. This disclosure contemplates other shapes and features for the outer edge member 144 including tapers, chamfers, or angular features, which are angled relative to the LEDs 136 to direct light into the interior of the waveguide 118. To further improve reflection of light, the reflector element 148 can add and/or improve reflective properties along the lit edge 106 of the waveguide 118. The reflector element 148 can be a separate member, secured to or incorporated into the waveguide 118, or a material layer (e.g., a coating) with light-reflective properties.

The optics element 150 can further influence the direction at which light from the LEDs 134 disperses. Examples of the optics element 150 include reflectors (e.g., cup reflectors) that surround all or a portion of the LEDs 136. Reflectors of this type are often included as part of the LED assembly. In one example, the optics element 150 may be a lens or lens element that is attached proximate the LED 136. Light from the LEDs 136 can impinge on the lens element, pass through the lens element, and then disperse into the interior of the waveguide 118. In another example, the optics element 150 may include an optical layer of material that is disposed onto a surface of the LEDs 136. This optical layer can have optical properties that effect changes, e.g., in the direction of light as the light leaves the LEDs 136.

Also in FIG. 3 is an exemplary arrangement of the heat sink 124. Generally, the heat sink 124 dissipates heat away from the LEDs 136. For example, the heat sink 124 can comprise thermally-conductive materials (e.g., metals) that can transfer heat by conduction, convection, and radiation. In the present example, the heat sink 124 is in thermal contact with the LEDs 136, either collectively using an elongated piece of material that spans at least a portion of the lit edge 106, or singularly using a properly sized and situated piece of material thermally contacting the LEDs 136 individually.

Figure 4:
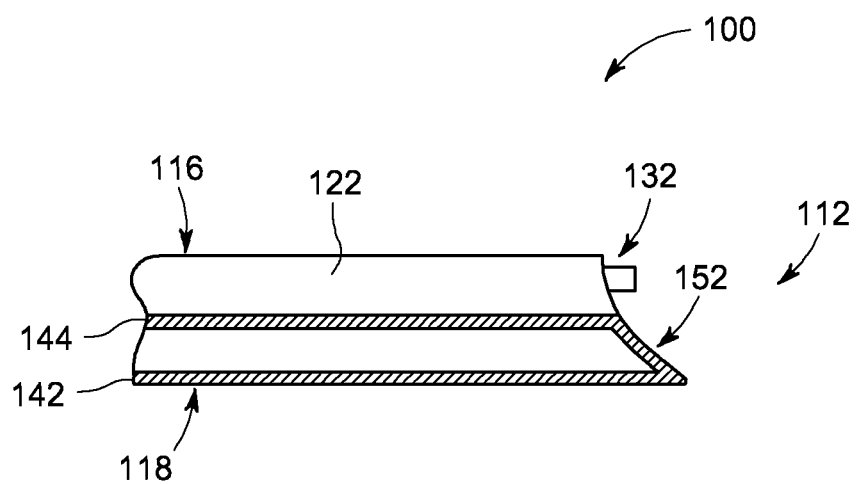
FIG. 4 depicts a side, cross-section of a portion of the lighting module of FIG. 1.

FIG. 4 shows a cross section of the unlit edge 112 taken at line B-B of FIG. 1. The waveguide 118 includes an outer edge member 152, which has a curved or otherwise tapered profile. The end of the elongated portion 122 also has a profile that can match and/or continue the profile of the outer edge member 152, but that also provides sufficient area to include the second interface 132 thereon. In one example, the profile of the outer edge member 152 matches the profile (e.g., radius) of the outer edge member 150 (FIG. 3) on the lit edge 106. Matching these profiles allows these two components to mate together, a feature that is important when constructing the LED lighting device, as discussed in more detail below.

Figure 5:
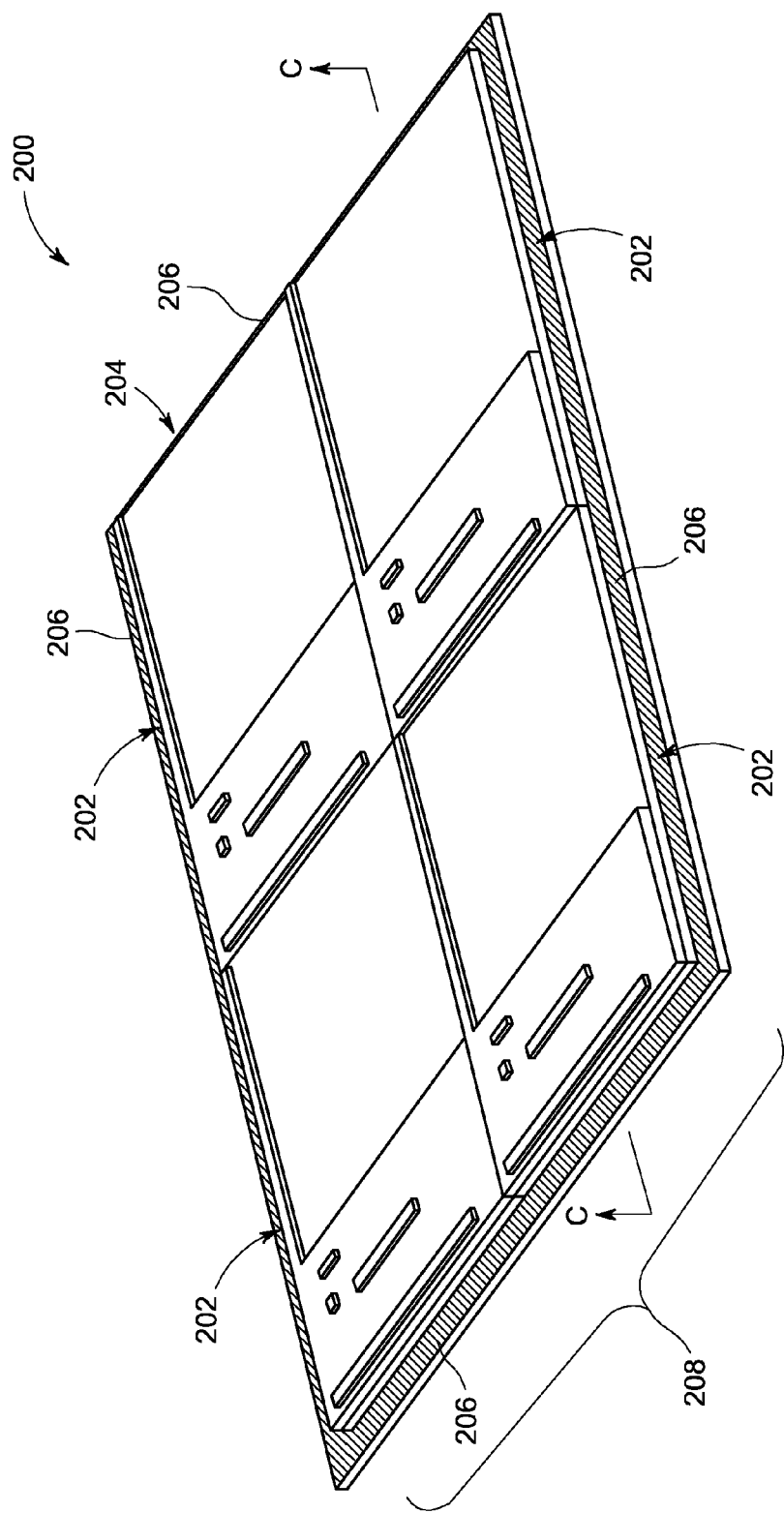
FIG. 5 depicts a top, perspective view of an example of a lighting fixture that includes an exemplary embodiment of a lighting module.

FIG. 5 illustrates a top view of an exemplary embodiment of an LED lighting device 200, which can replace many conventional lighting fixtures, e.g., fluorescent lighting fixtures. The LED lighting device 200 includes a plurality of lighting modules 202 (e.g., the lighting module 100 of FIGS. 1, 2, 3, and 4) and a frame 204 disposed about the periphery of the lighting modules 202. The frame 204 can include one or more members 206, which can be separate pieces or can be formed monolithically, e.g., as a pressed, stamped, or extruded parts. Configurations of the frame 204 provide features that can connect and/or support the LED lighting device 200 in position as part of a suspended ceiling. Other features of the frame 200 support the lighting modules 202 about, for example, one or more edges of the lighting modules 202. Examples of the frame 204 can comprise metals (e.g., aluminum), plastics, and composites, as well as combinations of materials as desired and compatible with the application or implementation in which the LED lighting device 200 is to deploy.

The lighting modules 200 form an array 208, which in the present example is a 2×2 array but can include any number of the lighting modules 202 as desired. The lighting modules 202 can be removed individually from the array 208 and replaced with another one of the light module 202. Abutting the lighting modules 202 causes the connectors to engage. This feature is beneficial to allow maintenance to occur without the need to dismantle and/or remove the entire LED lighting device 200 from its mounted position, e.g., in a ceiling.

The lighting modules 202 can couple to one or more adjacent modules via a connector or other implement through which signals (e.g., electrical signals) or "inputs and outputs" can travel. In this abutted configuration, the lighting modules 202 can share, among other things, power signals and instructive signals that dictate operation of the lighting modules 202 and/or the LED lighting device 200 in general. In one embodiment, one of the lighting modules 202 may operate as a master control module, which is configured to execute certain executable instructions and commands that dictate operation of the LED lighting device 200. The master control module may be equipped with a specific processor for this purpose or, in one example, the master control module may be designated by way of factory or manufacturing calibration and settings.

Figure 6:
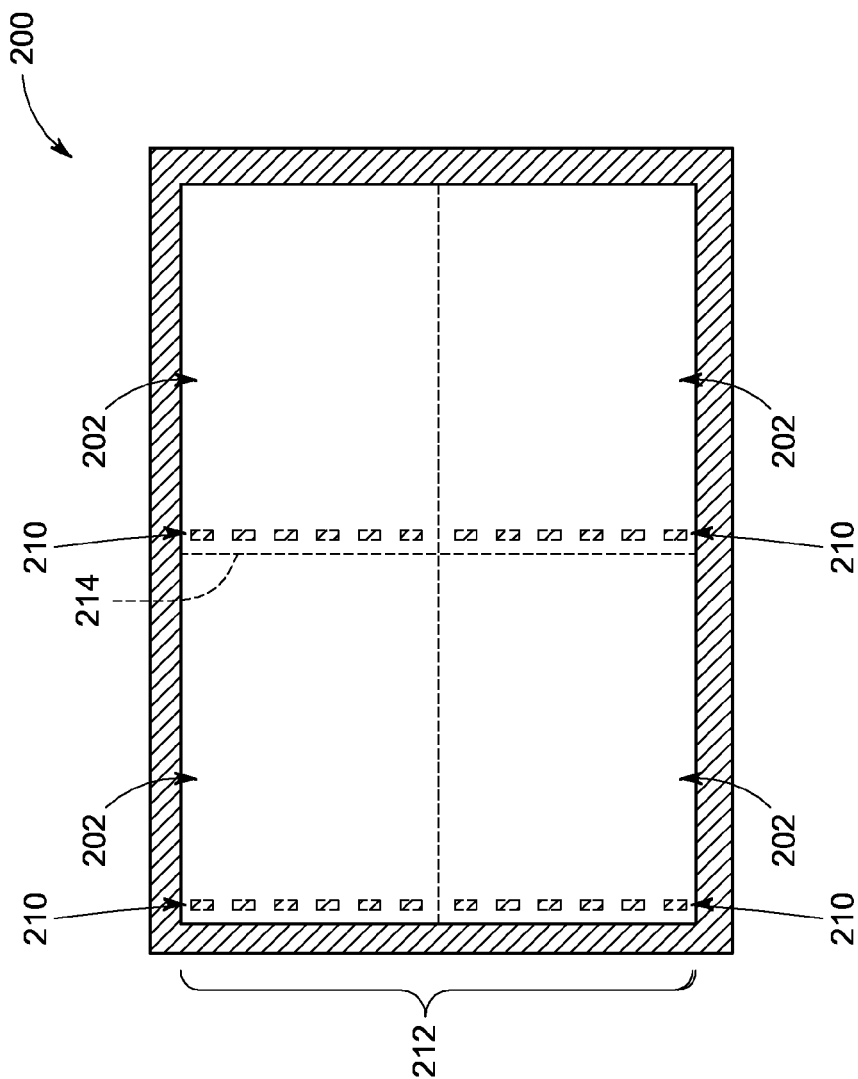
FIG. 6 depicts a front view of the lighting fixture of FIG. 5.

Turning next to FIG. 6, a bottom view (C-C) of the LED lighting device 200 provides an exemplary illustration of the lighted side from which the LED lighting device 200 emits light. As FIG. 6 shows, the lighting modules 202 include a plurality of light emitting diodes (LEDs) 210, extending along one edge of the lighting modules 202. Light generated by the LEDs 210 illuminate the lighted side to form an illuminated surface area 212. Typically the illuminated surface area 212 is lighted in its entirety, although selective operation of the lighting modules 202 can vary illumination and thus illuminate only portions of the illuminated surface area 212.

In one embodiment, the LED lighting device 200 can include a diffusion member to hide the mating lines (shown generally by the dashed lines 214 in FIG. 6) adjacent lighting modules 202 form. The mating lines 214 identify the edges (e.g., the edges 106, 110, 112, 114 of FIG. 1) of the individual lighting modules 202. The diffusion member can reside as a separate component of the assembly. Examples of the diffusion member can comprise a sheet or thin film of plastic, glass, or other materials with optical properties that effectively hide the mating lines 214 from view but that do not inhibit emission of light from the illuminated surface area 212.

Figure 7:
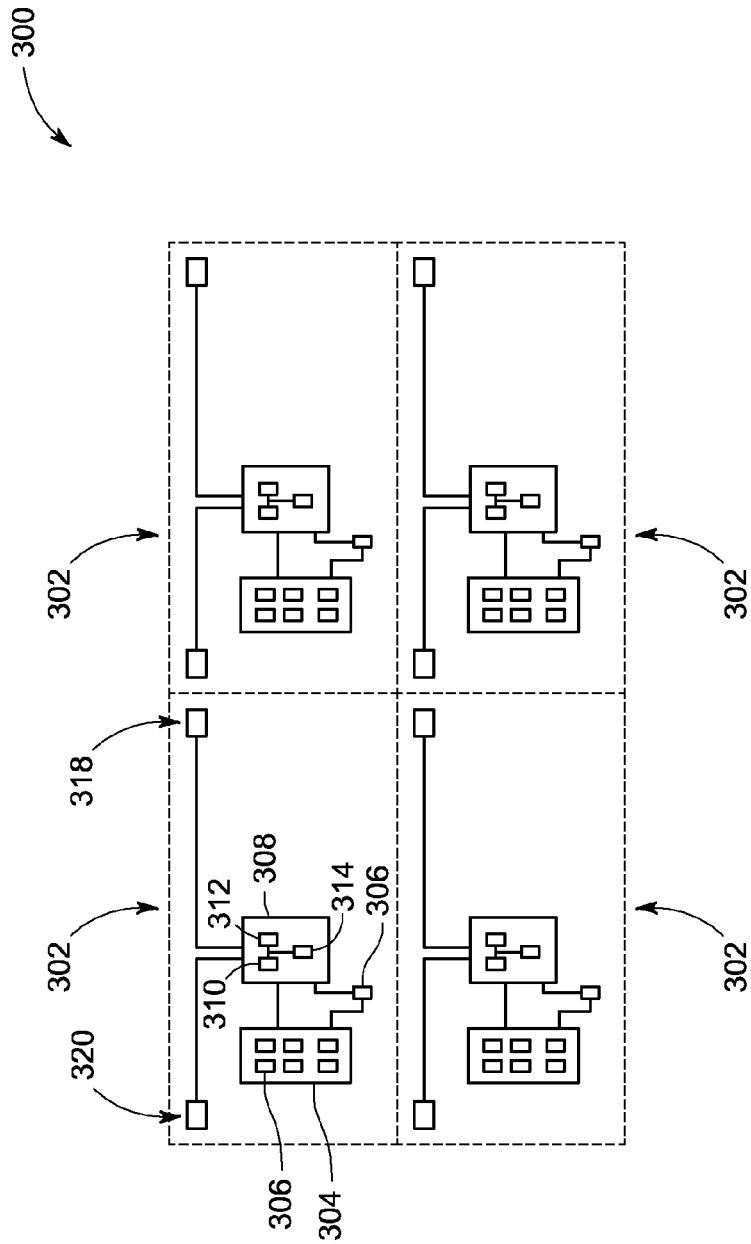
FIG. 7 depicts a high-level wiring schematic of an example of a lighting fixture.

FIG. 7 illustrates a high-level wiring schematic of an LED lighting device 300 (e.g. the LED lighting device 200 of FIGS. 5 and 6). Generally a variety of configurations can implement the concepts of the present disclosure. The example of FIG. 7 provides a schematic diagram of one exemplary structure. In the present example, the LED lighting device 300 comprises a plurality of lighting modules 302. Each of the lighting modules 302 includes a light engine 304 with a plurality of LEDs 306. The light engine 304 couples with a power unit 306 and a control circuit 308. The control circuit 308 can include a processor 310, memory 312, and a drive circuit 314 with circuitry to operate, e.g., the light engine 304 and the power unit 306. The lighting modules 302 also include an interface with a first interface 318 and a second interface 320.

In one example, the processor 310 is a central processing unit (CPU) such as an ASIC and/or an FPGA. The processor 310 can also include state machine circuitry or other suitable components capable of receiving inputs from the circuitry 314 and/or directly from the light engine 304, the interface 316, and/or other components (e.g., the power unit 306). The memory 312 comprises volatile and non-volatile memory and can be used for storage of software (or firmware) instructions and configuration settings. In some embodiments, the processor 310, the memory 312, and the circuitry 314 can be contained in a single integrated circuit (IC) or other component. As another example, the processor 310 can include internal program memory such as RAM and/or ROM. Similarly, any one or more of functions of these components can be distributed across additional components (e.g., multiple processors or other components).

In view of the foregoing, lighting modules such as those shown in FIGS. 1, 2, 3, 4, 5, 6, and 7, permit flexible arrangement and construction of LED lighting devices. The lighting modules can engage one another, e.g., via connectors, thereby permitting communication of signals that can facilitate selective operation. Moreover, connection of one lighting module to another permits sharing of power among many lighting modules that often comprise a lighting device. This feature reduces the size and other requirements that often necessitate large and unwieldy power supplies for use with larger LED lighting devices and, in particular, LED lighting devices having edge-lit displays.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is
1. A lighting module, comprising:
    a substrate having an elongated portion;
    a power unit disposed on the substrate;
    a light engine disposed on the substrate and coupled to the power unit, the light engine comprising a plurality of light emitting diodes disposed proximate a lit edge of the substrate;
    a control circuit disposed on the substrate and in communication with the light engine;
    an interface coupled to the substrate in communication with the control circuit, the interface comprising a connector and a port to receive the connector disposed on opposite sides of the substrate, wherein one of the connector and the port is located on an end of the elongated portion; and
    a waveguide disposed over the light engine, the waveguide directing light from the light engine to form an illuminated surface area,
    wherein the waveguide is bounded by a first outer edge member proximate the lit edge and a second outer edge member proximate an unlit edge of the substrate that is spaced apart from and parallel to the lit edge of the substrate,
    wherein the first outer edge member has an inner surface, an outer surface, and a first profile extending along the length of the lit edge that curves relative to the direction of light from the plurality of light emitting diodes and directs the light toward the unlit edge
    wherein the second outer edge member has a second profile extending along the length of the unlit edge that curves to match the first profile of the first outer edge member on the lit edge, and
    wherein the inner surface of the first outer edge member has a coating layer adapted to reflect light disposed thereon.
2. The lighting module of claim 1, further comprising an optical component that passes light from the light engine onto the waveguide.
3. The lighting module of claim 1, wherein the waveguide has a plurality of outer edge members that extend along the lit edge and an unlit edge of the waveguide, and wherein the outer edge member on the lit edge can mate with the outer edge member on the unlit edge.
4. The lighting module of claim 1, further comprising a heat sink in thermal contact with the light engine.
5. The lighting module of claim 1, wherein the LEDs are equally spaced along the light edge of the substrate.
6. The lighting module of claim 1, wherein the substrate comprises a printed circuit board (PCB).

7. An LED lighting device, comprising:

a peripheral frame; and a plurality of lighting modules in an array forming a lighted surface area bounded by the peripheral frame, the lighting module comprising a substrate having an elongated portion, a plurality of light emitting diodes disposed on the substrate proximate the peripheral frame, a power unit coupled to the light emitting diodes, a control circuit disposed on the substrate and in communication with the light engine, an interface coupled to the substrate in communication with the control circuit, the interface comprising a connector and a port to receive the connector disposed on opposite sides of the substrate, wherein one of the connector and the port is located on an end of the elongated portion, and a waveguide disposed over the light emitting diodes, the waveguide for directing light from the light emitting diodes forming an illuminated surface within the area bounded by the peripheral frame, wherein the waveguide is bounded by a first outer edge member proximate the lit edge and a second outer edge member proximate an unlit edge that is spaced apart from and parallel to the lit edge of the substrate, wherein the first outer edge member has an inner surface and an outer surface that has a first profile extending along the length of the lit edge that curves relative to the direction of light from the plurality of light emitting diodes and direct the light toward an unlit edge that is spaced apart from and parallel to the lit edge, wherein the second outer edge member has a second profile extending along the length of the unlit edge that curves to match the first profile of the outer edge member on the lit edge, and wherein the inner surface of the first outer edge member has a coating layer adapted to reflect light disposed thereon.

8. The apparatus of claim 7, wherein the array comprises adjacent lighting modules that communicate with one another.

9. The apparatus of claim 7, further comprising a diffusion member having optical properties that hide mating edges of the plurality of lighting modules from view.

10. The apparatus of claim 7, wherein one of the plurality of lighting modules is a master control module, and wherein the master control module can operate each of the other lighting modules in the array.

11. The apparatus of claim 7, wherein the lighting emitting diodes are located proximate a single edge of the plurality of lighting modules in the array.

* * * * *

UNITED STATES PATENT AND TRADEMARK OFFICE
CERTIFICATE OF CORRECTION

PATENT NO.       : 8,632,236 B2                                                  Page 1 of 1
APPLICATION NO.  : 13/289869
DATED            : January 21, 2014
INVENTOR(S)      : Urtiga It is certified that error appears in the above-identified patent and that said Letters Patent is hereby corrected as shown below:

In the Specification

Column 2, Line 27, delete "(LEDS)" and insert -- (LEDs) --, therefor.

Column 3, Line 17, delete "module 112" and insert -- module 100 --, therefor.

Column 3, Line 55, delete "LEDs 134" and insert -- LEDs 136 --, therefor.

Signed and Sealed this
Twentieth Day of May, 2014

Michelle K. Lee
*Deputy Director of the United States Patent and Trademark Office*